Patented Dec. 3, 1946

2,412,117

UNITED STATES PATENT OFFICE 2,412,117

PHENYL SULFONYL TRIESTERS OF NITRO ALCOHOLS

Philip J. Baker, Jr., Terre Haute, Ind., assignor to Commercial Solvents Corporation, Terre Haute, Ind., a corporation of Maryland No Drawing. Application July 9, 1945, Serial No. 604,083

4 Claims. (Cl. 260—456)

The present invention relates to new chemical compounds and is a continuation-in-part of my copending application Serial No. 521,125, filed February 4, 1944.

More particularly my invention relates to phenyl sulfonyl esters of nitro alcohols. The new chemical compounds of my invention may be represented by the following general structural formula:

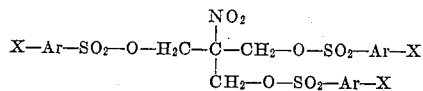

wherein X represents a substituent of the group consisting of hydrogen, alkyl and acylamino, and Ar represents a phenyl nucleus.

As examples of compounds included by the above generic formula there may be mentioned tris (p - toluenesulfonoxymethyl) nitromethane, tris (benzenesulfonoxymethyl) nitromethane, tris (p - acetamidobenzenesulfonoxymethyl) nitromethane, and the like.

In accordance with my invention, compounds of the above type are prepared by first mixing a trihydric nitro alcohol with a phenyl sulfonyl halide and thereafter slowly adding to this mixture a suitable base, such as, for example, a tertiary amine. The nitro alcohol and phenyl sulfonyl halide are preferably reacted with one another in approximately equivalent quantities while the tertiary amine is generally preferably employed in a quantity slightly in excess of the equivalent amount. The initial reaction is rather vigorous and precautions should therefore be taken in order to avoid decomposition of the reactants. After the initial stage of the reaction has been completed, however, the reaction mixture is preferably heated to a temperature of between about 80° and 100° C. so that the reaction is driven as nearly to completion as possible. The resultant mixture is then cooled, and water is added in order to remove the hydrogen halide of the tertiary amine and any unreacted alcohol which may be present. At this stage of the procedure, the ester will generally be observed to solidify. The product is then filtered and washed with water. In most cases the esters can be crystallized either from methanol or ethanol. Frequently benzene or similar hydrocarbons can be used for this purpose.

The nitro alcohol utilized in preparing the new phenyl sulfonyl esters of my invention is tris (hydroxymethyl) nitromethane.

As examples of tertiary amines which may be utilized in synthesizing the compounds of my invention, there may be mentioned pyridine, trimethylamine, tributylamine, quinoline, and the like. Bases such as sodium carbonate and sodium hydroxide may also be employed in place of tertiary amines; however, it has been my general observation that the results obtained when using such bases are less satisfactory. Solvents, such as benzene, chloroform, and xylene, may be employed. However, it has usually been found that the yield of the desired aryl sulfonyl ester is lower when a solvent is utilized.

My invention may be further illustrated by the examples which follow.

Example I

A mixture of 3.8 parts of tris(hydroxymethyl)-nitromethane and 13.4 parts of p-toluenesulfonyl chloride was placed in a reaction vessel and 6 parts of pyridine were slowly added thereto. The reaction mixture was cooled for a short period and then warmed gently over steam for 15 minutes. To the reaction mixture water was added and the mixture cooled and filtered. The solid product, namely tris(p-toluenesulfonoxymethyl) nitromethane, was filtered and recrystallized from methanol yielding 3.6 parts of product corresponding to a 23.5% yield. Its melting point was 122 to 123° C.

Analysis. Calculated for: % N, 2.28; % S, 15.66. Found: % N, 2.32; % S, 15.40.

Example II

Using the procedure described in Example I, and reacting tris(hydroxymethyl) nitromethane with benzenesulfonyl chloride, the product tris (benzenesulfonoxymethyl) nitromethane was prepared and found to have a melting point of 122 to 123° C., a nitrogen content of 2.88% as compared to a theoretical nitrogen of 2.45% and a sulfur content of 17.9% as compared to a theoretical sulfur value of 16.8%.

Although the physical properties given for the two compounds may be helpful in identifying them, it is to be understood that I do not limit myself to products having the exact physical constants described, since the data were obtained from single preparations of the compounds listed.

The phenyl sulfonyl esters of my invention are useful for numerous purposes, particularly as plasticizers for synthetic rubber and similar type polymers. Other uses of these products will readily occur to those skilled in the art.

My invention now having been described, what I claim is:

1. Phenyl sulfonyl esters of nitro alcohols having the formula

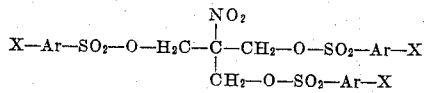

wherein X represents a substituent of the group consisting of hydrogen, alkyl and acylamino, and Ar represents a phenyl nucleus.

2. Tris(p - toluenesulfonoxymethyl) nitromethane.

3. Tris(benzenesulfonoxymethyl) nitromethane.

4. Tris(p-acetamidobenzenesulfonoxymethyl)-nitromethane.

PHILIP J. BAKER, Jr.